Dec. 23, 1958  R. GOSSMANN  2,865,692

COMPOUND BEARING WITH SYNTHETIC RESIN LAYERS

Filed Oct. 26, 1955

INVENTOR
RICHARD GOSSMANN
BY
ATTORNEYS.

United States Patent Office 2,865,692
Patented Dec. 23, 1958

2,865,692
COMPOUND BEARING WITH SYNTHETIC RESIN LAYERS

Richard Gossmann, Laucherthal, Sigmaringen, Germany

Application October 26, 1955, Serial No. 542,804

Claims priority, application Germany November 9, 1954

9 Claims. (Cl. 308—238)

It has been proposed before that compound bearings with synthetic resin layers may be made from a supporting body of metal, for instance of steel, copper, copper alloys, light metal, or from two or more metal layers, and a thin film of synthetic resin. To improve the sliding properties of the synthetic resin layers in bearings of this type, it has been suggested to admix the resin with fillers such as mica or metal powder. Mica additions brought about a certain degree of capillarity and thus increased the capacity of the sliding layer to take up lubricant, but at the same time these additions involved a certain drawback, namely corrosion due to contact between the lubricant and the metal support. Metal powders employed as fillers will reduce the adhesion of the resin layers on their support, especially if the latter is made of bronze.

The primary object of the present invention is to provide a compound metal and resin bearing which includes a metal shell and thin resin layers superimposed thereon, with the innermost layer having mica as filler material, such bearing avoiding the drawbacks of known compound bearings.

This and ancillary objects are attained by this invention, the preferred forms of which are described herein and shown in the accompanying drawing, wherein.

Figure 1:
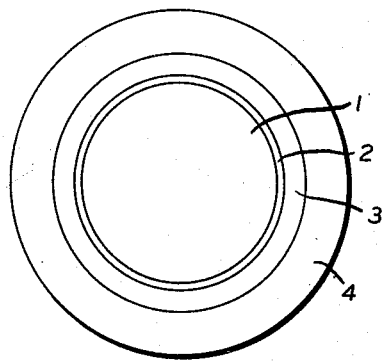
Figure 1 is an end elevational view of a shaft with a bearing, constructed in accordance with this invention, fitted therein and shown in side elevation.

The present invention relates to a compound bearing which avoids the aforementioned drawbacks of known bearings. In this regard, it has been found that such drawbacks are eliminated in a special construction of compound bearings utilizing (i) the property of mica additions to improve the adhesion of the synthetic resin layers on the underlying metal, such additions being made to the basic resin layer lying directly on the metal support, and (ii) the anticorrosive property of the synthetic resin, by applying a resin film which is not capable of absorbing lubricant to said mica-containing basic or binding layer. In this way the lubricant is not admitted to the mica-containing layer and to the metal support.

The anti-corrosive layer may be free from filler materials or may contain such fillers as metal powders that do not have an unfavourable effect on the density of the resin flow. Moreover, this layer may be coated with a further layer containing a filler improving the gliding effect, such a further layer being advisable especially in cases of heavy stress. The filler of said further layer may be mica or also metal powders. If mica is used, the gliding surface must be given a mechanical after-treatment, for instance a lathing or abrading treatment or the like. If metal powders are used, a suitable weight ratio of the resin serving as binding agent to metal powder will lie between 50:50 and 0.1:99.9, and preferably between 20:80 and 10:90.

The base metal of the metal support may be the metals ordinarily employed in the manufacture of bearings such as steel, bronze, brass, light metals or the like. The resins used for the resin layers are such that are readily curable and acquire satisfactory strength after having been hardened or cured. Suitable resins are pure or plastified phenol formaldehyde resins, for instance those obtained by alkaline condensation of phenols and formaldehyde, if desired accompanied or followed by a combination with softening agents, e. g. non-drying, semi-drying or drying oils or oil-free or oil modified alkyd resins and also epoxide resins. The latter are obtained according to known methods by reacting diphenols in particular p,p′-dihydroxy diphenyl dimethylmethane, in alkaline solution with epichlorohydrine or dichlorohydrine yielding epichlorohydrine.

The resin layers may be applied either with the aid of a paste-like resin mass containing the resins as such in undiluted, viscous form or diluted with a suitable solvent, or with the aid of resinous solutions by brushing, spraying or dipping, involving such measures as are commonly employed in the lacquer technique. Each of the two or three resin layers of the bearing according to the invention is formed preferably in such a manner that the resin mass or solution which is used for producing each individual layer is applied by repeated brushings to form each time a thin film, and then either each of these films is heat-hardened individually, directly after drying, or all the films are heat-hardened together after having been applied. According to the type of resin employed, the hardening temperatures may vary between 160° C. and 250° C.

The base layer which contains synthetic resin and mica serves as a binding layer for the layers applied onto it. The mica addition, corresponding preferably to a weight ratio resin: mica=about 1.7:1, is necessary to achieve satisfactory adhesion of the resin layers to the metal surface of the supporting body. The resin layer which lies on top of this binding layer and which may be free from fillers or may contain metal powder serves as an anti-corrosive layer lying on the base layer as an impervious resin film which is impermeable to the lubricant ordinarily employed. In case the loads on the bearing are not too great this layer may be used directly as the sliding layer. If greater loads are to be expected and especially if this layer does not comprise any filler it may be coated with a further layer which serves solely to form the sliding surface and which preferably contains the same synthetic resin in combination with mica or metal powder as filler material.

In this case, the use of mica will give a sliding surface interspersed with capillaries due to the contraction occurring when the resin coatings are hardened and causing a more or less far-reaching splitting of the mica particles and thus formation of minute cracks and fissures in the hardened layer. Then when said layer is subjected to a mechanical after-treatment—abrasion, lathing or the like—those cracks and fissures are opened at the surface so as to form capillaries which are inter-connected to a greater or lesser extent. Due to this structure the layer can take up the lubricant, and in this manner the bearing will be a self-lubricating bearing which because of its excellent properties during its initial operation is particularly suitable for heavy loads.

If the sliding layer of synthetic resin is to contain metal powder the resin is admixed with finely pulverized metal such as iron, especially cast iron, lead, tin, copper or light metals, if desired in admixture with an oxide of these metals. Mixtures of different metal powders or metal alloy powders may also be employed. The amount of metal powder employed may vary within wide limits but should preferably be at least as great as the amount of synthetic resin. However, it may also exceed the amount of resin, and particularly favourable results have been obtained with weight ratios of metal powder to resin ranging from about 50:50 to about 99.9 to 0.1, preferably from 80:20 to 90:10. To obtain a uniform distribution of metal powder in the resin the powder is mixed into liquid resin and the mixture is then stirred until it has become as homogeneous as possible. The sliding layers thus obtained are characterized by good heat conductivity, good sliding properties and high resistance under heavy stress.

A bearing according to the invention may for instance be constructed in the following manner:

A base layer consisting of a curable phenol formaldehyde resin admixed with mica in a quantity amounting to 57% of the resin is applied to a metal body as a 0.06 mm. layer. For this purpose a resin/mica solution is applied by one or two brushings, and the film obtained is hardened at 190° C. This base layer is coated with a second layer of the same phenol formaldehyde resin but without any mica. This layer which has a thickness of 0.12–0.16 mm. has been obtained by 6–8 brush or spray applications of a resin solution and subsequent hardening of each film applied, at about 190–220° C.

An example of another construction is the following:

A base layer consisting of a curable epoxide resin and mica in a quantity amounting to 55% of the resin is applied to a metal body as an about 0.06 mm. layer by one or more brush applications of a corresponding solution and hardening of the mica-bearing film at 250° C. On top of this layer, a 0.04–0.05 mm. film serves as an anti-corrosive layer; it consists of the same epoxide resin but does not contain mica or any other addition and has been applied in the same way as the base layer. The third layer, i. e. the sliding layer, has a thickness of 0.12–0.16 mm., consists again of epoxide resin and mica, and has been obtained by 6–8 brush applications of a solution having the same composition as that employed for the base layer, the individual films thus obtained being hardened separately, beginning at 180° C. for the first film and ending at 250° C. for the last film, this hardening treatment being carried on for 10 minutes. When the burning process has been terminated this sliding layer is subjected to abrasion as an after-treatment. The sliding layer is interspersed with capillaries extending from its surface, and the bearing will thus in conjunction with the lubricant oil be a bearing of the self-lubricating type.

A similar bearing which is especially suitable for great stress is constructed and manufactured in the same manner but instead of being provided with a sliding layer of epoxide resin and mica is given a sliding layer of epoxide resin and lead powder in a ratio of 85 parts by weight of lead powder to 15 parts by weight of 100% resin. In this case, the anti-corrosive intermediate layer of filler-free resin may be omitted.

Figure 2:
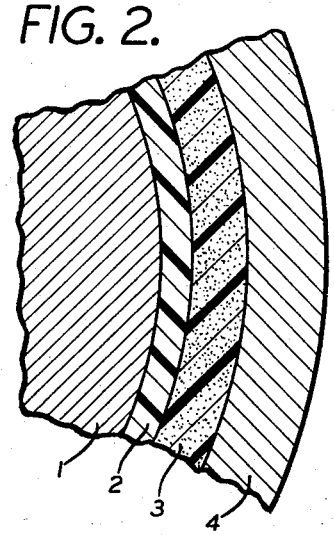
Figure 2 is an enlarged detailed cross-sectional view of the bearing showing the structural make-up thereof.

As shown in Figures 1 and 2, the compound bearing includes a layer of synthetic resin, either alone or admixed with metal powder, as afore-described. The inner layer 2 is circumposed on the shaft or axle 1 and has a layer 3 of synthetic resin with mica superimposed thereon. The base metal 4 surrounds the layer 3.

Figure 3:
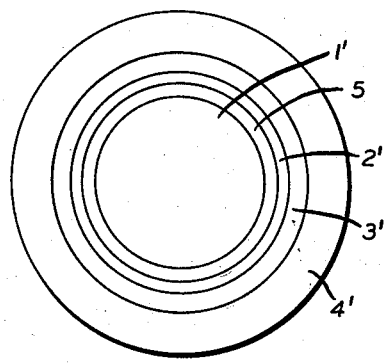
Figure 3 is a side elevational view of a modified form of bearing which is shown fitted on a shaft.
Figure 4:
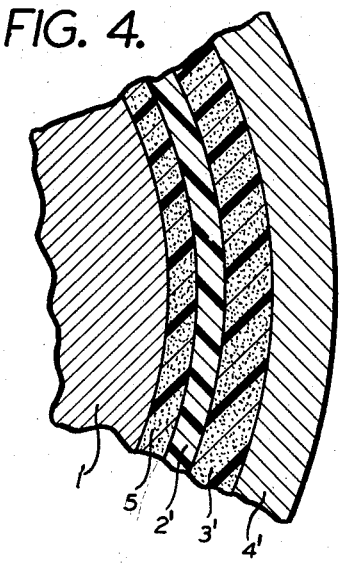
Figure 4 is an enlarged detailed cross-sectional view of the bearing of Figure 3.

In Figures 3 and 4, a modified form of bearing as afore-described is shown and the axle or shaft 1' is directly surrounded by a layer 5 of synthetic resin with mica of metal powder or metal oxide added thereto. The layer 5 is interposed between the shaft 1' and the layer 2', which is the layer of synthetic resin alone or mixed with metal powder. The layer 3' is made up of synthetic resin plus mica and 4' represents the base metal.

What I claim is:

1. A compound metal and resin bearing comprising a metal shell and superimposed on said shell at least two thin layers, the inner one of said layers which is in contact with said metal shell and the layer directly overlying said inner layer comprising a curable resin from the class comprising epoxide resins and phenol formaldehyde resins, said inner resin layer additionally comprising mica as filler material, said mica causing the formation of capillaries in said inner resin layer, while the resin layer directly overlying said inner resin layer protects the metal shell from contact with the lubricant.

2. A compound metal and resin bearing comprising a metal shell and, superimposed on said shell, at least two thin layers the inner one of said layers which is in contact with said metal shell and the layer directly overlying said inner layer each comprising a curable resin from the class comprising epoxide resins and phenol formaldehyde resins, said inner layer additionally comprising mica as filler material and said overlying layer comprising metal powder as filler material, said mica causing the formation of capillaries in said inner resin layer, while the resin layer directly overlying said inner resin layer protects the metal shell from contact with the lubricant.

3. A compound metal and resin bearing comprising a metal shell and, superimposed on said shell, two thin layers, the inner one of said layers which is in contact with said metal shell comprising a curable resin from the class comprising epoxide resins and phenol formaldehyde resins, said resin being admixed with mica as filler material, and the resin layer overlying said mica filler admixed resin layer only comprising a curable resin from the said class, said mica causing the formation of capillaries in said inner resin layer, while the resin layer directly overlying said inner resin layer protects the metal shell from contact with the lubricant.

4. A compound metal and resin bearing comprising a metal shell and, superimposed on said shell, two thin layers, the inner one of said layers which is in contact with said metal shell comprising a curable resin of the class comprising epoxide resins and phenol formaldehyde resins, said resin being admixed with mica as filler material, and the layer overlying said mica filler admixed resin layer comprising a curable resin from the said class in admixture with metal powder as filler material, said mica causing the formation of capillaries in said inner resin layer, while the resin layer directly overlying said inner resin layer protects the metal shell from contact with the lubricant.

5. A compound metal and resin bearing comprising a metal shell and, superimposed on said shell, three thin layers, the inner one of said layers which is in contact with said metal shell comprising a curable resin from the class comprising epoxide resins and phenol formaldehyde resins, said resin of the inner layer being admixed with mica as filler material, the layer on top of said mica filler admixed inner resin layer only comprising a curable resin from the said class, and the surface layer on top of said plain resin layer comprising a curable resin from the said class in admixture with metal powder as filler material, said mica causing the formation of capillaries in said inner resin layer, while the resin layer directly overlying said inner resin layer protects the metal shell from contact with the lubricant.

6. A compound metal and resin bearing comprising a metal shell and superimposed on said shell, three thin layers each comprising a curable synthetic resin from the class comprising epoxide resins and phenol formaldehyde resins, the inner one of said resin layers which is in contact with said metal shell and the outermost resin layer forming the bearing surface additionally comprising mica as filler material whereas the intermediate resin layer only comprises said resin, said mica causing the formation of capillaries in said inner resin layer, while the resin layer directly overlying said inner resin layer protects the metal shell from contact with the lubricant.

7. A compound metal and resin bearing comprising a metal shell and, superimposed on said shell, three thin layers, the inner one of said layers which is in contact with said metal shell comprising a curable resin from the class comprising epoxide resins and phenol formaldehyde resins, said resin being admixed with mica as filler material, the resin layer on top of said mica filler admixed inner resin layer only comprising a curable resin from the said class, and the surface resin layer on top of said plain resin layer comprising a curable resin from the said class in admixture with metal powder and metal oxide powder as filler material, said mica causing the formation of capillaries in said inner resin layer, while the resin layer directly overlying said inner resin layer protects the metal shell from contact with the lubricant.

8. A compound metal and resin bearing comprising a metal shell and, superimposed on said shell, three thin layers each comprising a curable synthetic resin from the class comprising epoxide resins and phenol formaldehyde resins, the inner one of said resin layers which is in contact with said metal shell comprising mica as filler material, the outermost resin layer forming the bearing surface also comprising mica as filler material and having been subjected to a mechanical after-treatment after curing, and the intermediate resin layer only comprising said resin, said mica causing the formation of capillaries in said inner resin layer, while the resin layer directly overlying said inner resin layer protects the metal shell from contact with the lubricant.

9. A compound metal and resin bearing comprising a metal shell, and superimposed on said shell, three thin layers, the inner one of said layers which is in contact with said metal shell comprising a curable resin from the class comprising epoxide resins and phenol formaldehyde resins, said resin of the inner layer being admixed with mica as filler material, the layer on top of said mica filler admixed inner resin layer only comprising a curable resin from the said class, and the surface layer on top of said pure resin layer comprising a curable resin from the said class in admixture with metal powder as filler material, the weight ratios of resin to metal powder in said surface resin layer ranging from 50:50 to 0.1:99.9, said mica causing the formation of capillaries in said inner resin layer, while the resin layer directly overlying said inner resin layer protects the metal shell from contact with the lubricant.

References Cited in the file of this patent
UNITED STATES PATENTS

| | | |
|---|---|---|
| 2,055,507 | Shirley | Sept. 29, 1936 |
| 2,219,054 | Palm et al. | Oct. 22, 1940 |
| 2,431,921 | Cook | Dec. 2, 1947 |
| 2,581,301 | Saywell | Jan. 1, 1952 |
| 2,695,425 | Stott | Nov. 30, 1954 |
| 2,772,930 | Schubert et al. | Dec. 4, 1956 |